United States Patent
Yasuda et al.

(10) Patent No.: US 9,438,423 B2
(45) Date of Patent: Sep. 6, 2016

(54) ENCRYPTION DEVICE, ENCRYPTION METHOD, AND INFORMATION PROCESSING DEVICE

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/633,933

(22) Filed: Feb. 27, 2015

(65) Prior Publication Data

US 2015/0270964 A1 Sep. 24, 2015

(30) Foreign Application Priority Data

Mar. 24, 2014 (JP) .................. 2014-060926

(51) Int. Cl.
*H04L 29/06* (2006.01)
*H04L 9/32* (2006.01)
*H04L 9/14* (2006.01)
*H04L 9/00* (2006.01)
*H04L 9/08* (2006.01)

(52) U.S. Cl.
CPC ................ *H04L 9/14* (2013.01); *H04L 9/008* (2013.01); *H04L 9/0825* (2013.01); *H04L 2209/76* (2013.01)

(58) Field of Classification Search
CPC ........... H04L 9/30; H04L 9/14; H04L 9/008; H04L 9/0825
USPC ...................... 713/26, 171, 150, 153; 380/30
See application file for complete search history.

(56) References Cited

U.S. PATENT DOCUMENTS

| 8,532,289 | B2* | 9/2013 | Gentry .................... H04L 9/008 380/277 |
| 8,897,449 | B1* | 11/2014 | Broadbent ............ H04L 9/0891 380/277 |
| 9,077,525 | B2* | 7/2015 | Chandran ............... H04L 9/088 |
| 9,191,196 | B2* | 11/2015 | Raykova ................. H04L 9/008 |

(Continued)

FOREIGN PATENT DOCUMENTS

| JP | 2008-176193 A | 7/2008 |
| JP | 2012-220834 A | 11/2012 |
| JP | 2012-237881 A | 12/2012 |

OTHER PUBLICATIONS

Extended European Search Report dated Aug. 11, 2015 for corresponding European Patent Application No. 15156568.6, 9 pages.

(Continued)

*Primary Examiner* — Dede Zecher
*Assistant Examiner* — Dereena Cattungal
(74) *Attorney, Agent, or Firm* — Fujitsu Patent Center

(57) ABSTRACT

An encryption server receives encrypted data which is encrypted by using a public key of a first user and which is added with auxiliary information calculated using a combination of a secret key and the public key of the first user and data to be encrypted. Then, the encryption server generates re-encrypted data obtained by re-encrypting the encrypted data using the auxiliary information added to the encrypted data, a public key of a second user, and encrypted information related to the secret key of the first user which is encrypted with the public key of the second user.

3 Claims, 5 Drawing Sheets

(56) References Cited

U.S. PATENT DOCUMENTS

| | | | | | |
|---|---|---|---|---|---|
| 2011/0243320 | A1* | 10/2011 | Halevi | ............... | H04L 9/008 380/30 |
| 2013/0170640 | A1* | 7/2013 | Gentry | ............... | H04L 9/28 380/30 |
| 2013/0246813 | A1* | 9/2013 | Mori | ............... | G06F 17/30289 713/193 |

OTHER PUBLICATIONS

Yasuda, Masaya et al., "Secure Pattern Matching using Somewhat Homomorphic Encryption," pp. 65-76, Nov. 8, 2013, XP058034246.

Yasuda, Masaya et al., "Analysis of Lattice Reduction Attack against the Somewhat Homomorphic Encryption Based on Ideal Lattices," pp. 1-16, Sep. 13, 2012, XP047037754.

Yasuda, Masaya et al., "Practical Packing Method in Somewhat Homomorphic Encryption," Sep. 13, 2013, Retrieved from the Internet: URL:http://research.icbnet.ntua.gr/DPM2013/resources/slides/05.pdf, [retrieved on Jun. 29, 2015], pp. 1-12, XP055198848.

Lagendijk, R. L. et al., Encrypted Signal Processing for Privacy Protection, [Conveying the utility of homomorphic encryption and multiparty computation], IEEE Signal Processing Magazine, vol. 30, No. 1, pp. 82-105, Jan. 1, 2013, XP011505535.

Craig Gentry,"Fully Homomorphic Encryption Using Ideal Lattices", STOC '09, May 31-Jun. 2, 2009, Bethesda, Maryland, USA, 2009 ACM 978-1-60558-506-2/09/05, pp. 169-178, 2009 (10 pages).

Kristin Lauter et al.,"Can Homomorphic Encryption be Practical?", In ACM workshop on Cloud Computing Security Workshop—CCSW' 11, Oct. 21, 2011, Chicago, Illinois, USA, 2011 ACM 978-1-4503-1004-8/11/10, pp. 113-124 (12 pages).

* cited by examiner

ENCRYPTION DEVICE, ENCRYPTION METHOD, AND INFORMATION PROCESSING DEVICE

CROSS-REFERENCE TO RELATED APPLICATION

This application is based upon and claims the benefit of priority of the prior Japanese Patent Application No. 2014-060926, filed on Mar. 24, 2014, the entire contents of which are incorporated herein by reference.

FIELD

The embodiments discussed herein are directed to an encryption device, an encryption method, an information processing device, and an encryption system.

BACKGROUND

While the regulation of protection of personal information and confidential information is strengthened, a market of services that use such information is expanding. Further, a concealing technique is used in which data can be utilized while personal information and confidential information are maintained in a protected state. Among the concealing techniques, there is a technique that uses an encryption technique and a statistical technique according to a data type and service requirements.

As a concealing technique that uses an encryption technique, a homomorphic encryption technique is known. The homomorphic encryption technique is one of public key cryptosystems that use a pair of different keys for encryption and decryption and is an encryption technique that can handle encrypted data as it is. For example, when an encryption function of a homomorphic encryption method related to addition or multiplication for plain texts m1 and m2 is E, characteristics of the following formula (1) or (2) are established.

$$E(m1)+E(m2)=E(m1+m2) \quad (1)$$

$$E(m1)*E(m2)=E(m1*m2) \quad (2)$$

The characteristics where the formula (1) is established are referred to as homomorphism for addition and the characteristics where the formula (2) is established are referred to as homomorphism for multiplication.

When the homomorphic encryption method is used, it is possible to obtain an encrypted text of an addition or multiplication calculation result without decrypting the encrypted text by addition or multiplication of the encrypted text. The characteristics of the homomorphic encryption are used in a field of electronic voting and electronic cash and a field of cloud computing. As the homomorphic encryption method, an RSA (Rivest Shamir Adleman) encryption method used for multiplication and an Additive ElGamal encryption method used for addition are typical.

In recent years, a homomorphic encryption method that can be used for both addition and multiplication is known, and further, a homomorphic encryption method which can be used for both addition and multiplication and whose processing performance and encrypted data size are practical is known.

Here, as an example, the homomorphic encryption method will be described. First, mainly three key generation parameters (n, q, t) are prepared for generating an encryption key. Here, n is a power of two and called a lattice dimension, q is a prime number, and t is an integer smaller than q. In a procedure for generating an encryption key, first, as a secret key, an n-dimensional polynomial equation sk in which each coefficient is very small is randomly generated. The smallness of each coefficient is limited by a certain parameter o. Next, an n-dimensional polynomial equation a1 in which each coefficient is smaller than q and an n-dimensional polynomial equation e in which each coefficient is very small are randomly generated.

Then, "a0=−(a1*sk+t*e)" is calculated and a pair (a0, a1) is defined as a public key pk. However, when the polynomial equation of a0 is calculated, a (less than n)-dimensional polynomial equation is calculated at all times by calculating as $x^n=-1$, $x^{n+1}=-x$, and so on for an (n or more)-dimensional polynomial equation. Further, as a coefficient of the polynomial equation, a remainder obtained by dividing the coefficient by the prime number q is outputted. A space in which such a calculation is performed is often academically represented as $Rq:=Fq[x]/(x^n+1)$.

Next, three n-dimensional polynomial equations u, f, and g in which each coefficient is very small are randomly generated for a plain text data m represented by an n-dimensional polynomial equation in which each coefficient is smaller than t and a public key pk=(a0, a1), and encrypted data E(m, pk)=(c0, c1) of the plain text data m is defined as follows. That is to say, (c0, c1) is calculated as c0=a0*u+t*g+m, and c1=a1*u+t*f. These calculations are also performed in the space Rq.

Then, for two encrypted texts E(m1, pk)=(c0, c1) and E(m2, pk)=(d0, d1), encryption addition E(m1, pk)+E(m2, pk) is calculated as (c0+d0, c1+d1) and encryption multiplication E(m1, pk)*E(m2, pk) is calculated as (c0+d0, c0*d1+c1*d0, c1*d1). When the encryption multiplication is performed in this way, note that the data size of the encrypted text becomes three-component vector from two component vector.

Finally, regarding a decryption process, for an encrypted text c=(c0, c1, c2, and so on) (here, it is assumed that the number of components of encrypted text data is increased by an encryption operation such as a plurality of encryption multiplications), decryption is performed by calculating as Dec(c, sk)=[c0+c1*sk+c2*$sk^2$+ . . . ]q mod t by using the secret key sk. Here, regarding the value of [z]q, a remainder w is calculated by dividing an integer z by q, and if w<q, [z]q=w is outputted, and if w≥q, [z]q=w−q is outputted. Further, a mod t means a remainder obtained by dividing an integer a by t.

Hereinafter, numerical examples will be illustrated.

The secret key sk=Mod(Mod(4,1033)*$x^3$+Mod(4,1033)*$x^2$+Mod(1,1033)*$x,x^2$+1)

The public key pk=(a0,a1)

a0=Mod(Mod(885,1033)*$x^3$+Mod(519,1033)*$x^2$+Mod(621,1033)*x+Mod(327,1033),$x^4$+1)

a1=Mod(Mod(661,1033)*$x^3$+Mod(625,1033)*$x^2$+Mod(861,1033)*x+Mod(311,1033),$x^4$+1)

E(m,pk)=(c0,c1)

The plain text data m=3+2x+2$x^2$+2$x^3$ c0=Mod(Mod(822,1033)*$x^3$+Mod(1016,1033)*$x^2$+Mod(292,1033)*x+Mod(243,1033),$x^4$+1)

c1=Mod(Mod(840,1033)*$x^3$+Mod(275,1033)*$x^2$+Mod(628,1033)*x+Mod(911,1033),$x^4$+1)

In the values described above, the key generation parameter (n, q, t) is set to (4, 1033, 20). Further, Mod(a, q) means a remainder obtained by dividing the integer a by the prime number q, and Mod(f(x), $x^4+1$) means a remainder polynomial equation obtained by dividing a polynomial equation f(x) by a polynomial equation $x^4+1$. However, it means that $x^4=-1$, $x^5=x$, . . . and the like.

When the homomorphic encryption method described above is used for a concealment calculation, each user who provides data encrypts data by using a common public key generated by an analyst who analyzes the data and stores the encrypted data in an analysis device. The analysis device analyzes the encrypted data as it is. The analyst obtains an analysis result by decrypting the data analyzed by the analysis device by using his or her secret key.

Cloud computing has become widely used, so that a plurality of analysts may share and use the encrypted data in the concealment calculation. Therefore, a concealment calculation using re-encryption in which the encryption key is replaced is widely used.

For example, each user who provides data stores encrypted data encrypted with his or her public key in the analysis device. The analysis device replaces a key of the encrypted data with a key of the analyst by using a secret key of each user encrypted with a public key of the analyst, that is to say, the analysis device performs the re-encryption. The analysis device analyzes the encrypted data, which is re-encrypted with the key of the analyst, as it is. The analyst obtains an analysis result by decrypting the data analyzed by the analysis device by using his or her secret key.

Patent Literature 1: Japanese Laid-open Patent Publication No. 2008-176193

Patent Literature 2: Japanese Laid-open Patent Publication No. 2012-220834

Patent Literature 3: Japanese Laid-open Patent Publication No. 2012-237881

Non Patent Literature 1: C. Gentry, "Fully Homomorphic encryption using ideal lattices", *STOC* 2009, *ACM*, pp. 169-178, 2009.

Non Patent Literature 2: K. Lauter, M. Naehrig and V. Vaikuntanathan, "Can Homomorphic Encryption be Practical?", *In ACM workshop on Cloud Computing Security Workshop—CCSW* 2011, *ACM*, pp. 113-124, 2011.

However, a re-encryption process in the homomorphic encryption method described above takes time because the re-encryption process includes many complicated encryption processes and decryption processes. For example, in an analysis device installed on a cloud system or the like, data encrypted with a different encryption key is analyzed as it is, and then the data is further encrypted with an encryption key of an analyst. Therefore, each process for the data is performed in a state in which the data is encrypted, so that the processing cost is high.

SUMMARY

According to an aspect of the embodiment, an encryption device includes a reception unit that receives encrypted data which is encrypted by using a public key of a first user and which is added with auxiliary information calculated using a combination of a secret key and the public key of the first user and data to be encrypted; and a generation unit that generates re-encrypted data obtained by re-encrypting the encrypted data using the auxiliary information added to the encrypted data, a public key of a second user, and encrypted information related to the secret key of the first user which is encrypted with the public key of the second user.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to accompanying drawings. The invention is not limited by the embodiments.

[a] First Embodiment

Entire Configuration Diagram

Figure 1:
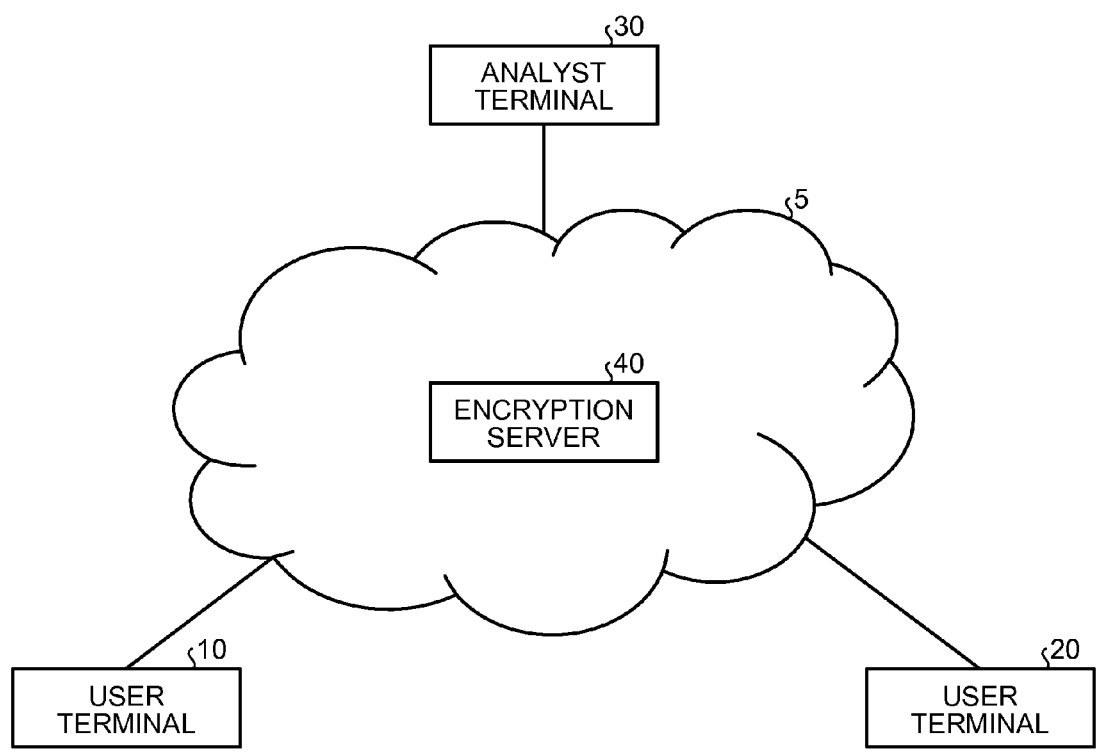
FIG. 1 is a diagram illustrating an example of an entire configuration of a system according to a first embodiment.

FIG. 1 is a diagram illustrating an example of an entire configuration of a system according to a first embodiment. As illustrated in FIG. 1, the system is an encryption system using cloud computing including a user terminal 10, a user terminal 20, an analyst terminal 30, and an encryption server 40. The number of the devices illustrated in FIG. 1 is an example and is not limited by the number of the devices illustrated in FIG. 1.

The user terminal 10 and the use terminal 20 are terminals that generate encrypted data obtained by encrypting a plain text such as calculation data and measurement data and store the encrypted data in the encryption server 40. The user terminal 10 and the user terminal 20 are, for example, a personal computer, general-purpose server, and a smartphone.

The analyst terminal 30 is a device that requests the encryption server 40 to perform analysis processing using the encrypted data generated by the user terminal 10 and/or the user terminal 20 and acquires an analysis result from the encryption server 40. The analyst terminal 30 is, for example, a personal computer, a general-purpose server, and a smartphone. While various processing can be applied as an example of the analysis, for example, addition and multiplication of encrypted data can be applied.

The encryption server 40 is a server device installed on a cloud system 5 accessible from each user terminal and the analyst terminal 30. The encryption server 40 re-encrypts the encrypted data generated by each user terminal by using a key of an analyst and analyzes the re-encrypted data as it is.

In such a system, each user terminal transmits encrypted data that is encrypted by using a public key of the user terminal to the encryption server 40. At this time, each user terminal adds auxiliary information calculated by using a combination of a secret key and the public key of the terminal and unencrypted data of the encrypted data to the encrypted data and then transmits the encrypted data to the encryption server 40. Further, each user terminal transmits encrypted information obtained by encrypting the secret key of the user terminal with a public key of the analyst terminal 30 to the encryption server 40.

When the encryption server 40 receives an analysis request from the analyst terminal 30, the encryption server 40 re-encrypts each encrypted data acquired from each user terminal by using a public key of the analyst. Specifically, the encryption server 40 performs re-encryption of each encrypted data by using each auxiliary information added to each encrypted data, the public key of the analyst terminal 30, and the encrypted information acquired from each user terminal. Subsequently, the encryption server 40 analyzes the re-encrypted data as it is and generates analysis re-encrypted data. Thereafter, the analyst terminal 30 acquires the analysis re-encrypted data generated by the encryption server 40 and decrypts the analysis re-encrypted data with a secret key of the analyst terminal 30 to obtain an analysis result.

In this way, when encrypting data, each user terminal generates the auxiliary information used when the data is re-encrypted and transmits the auxiliary information to the encryption server 40 along with the encrypted data. When the encryption server 40 re-encrypts the encrypted data, the encryption server 40 re-encrypts the encrypted data by using the auxiliary information. As a result, it is possible to simplify the re-encryption process and reduce the processing time of the re-encryption process.

Configurations of Devices

Figure 2:
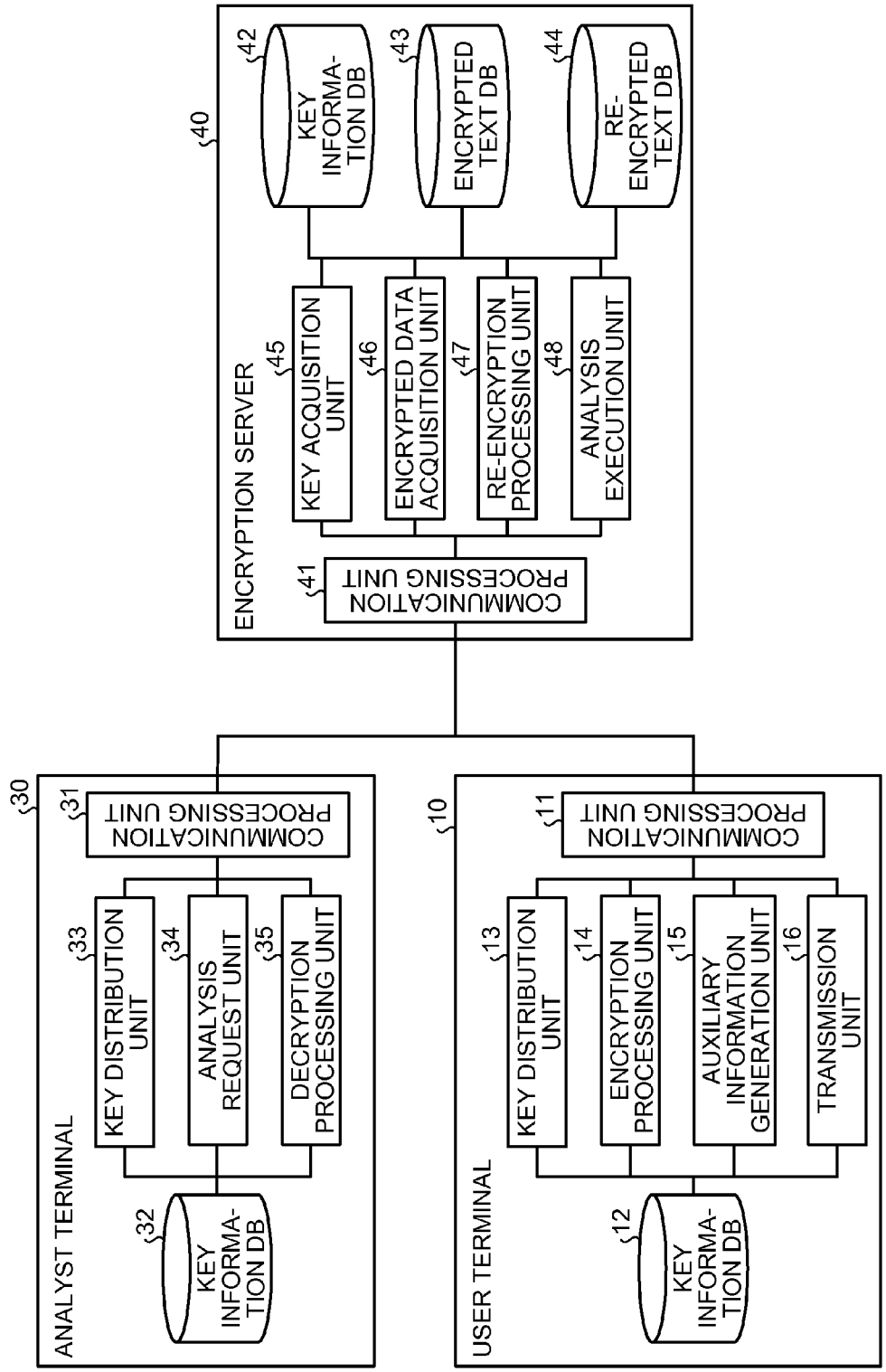
FIG. 2 is a functional block diagram illustrating a functional configuration of each device according to the first embodiment.

Next, functional configurations of each device included in the system illustrated in FIG. 1 will be described. Here, the functional configurations of the user terminal 10, the analyst terminal 30, and the encryption server 40 will be specifically described. FIG. 2 is a functional block diagram illustrating the functional configuration of each device according to the first embodiment. The user terminal 20 has the same configuration as that of the user terminal 10, so that detailed description thereof will be omitted.

Functional Configuration of User Terminal

As illustrated in FIG. 2, the user terminal 10 includes a communication processing unit 11, a key information DB 12, a key distribution unit 13, an encryption processing unit 14, an auxiliary information generation unit 15, and a transmission unit 16. The key distribution unit 13, the encryption processing unit 14, the auxiliary information generation unit 15, and the transmission unit 16 are an example of a process performed by a processor or an example of a circuit included in an electronic circuit.

The communication processing unit 11 is a processing unit that controls communication with the encryption server 40 on the cloud system 5. The communication processing unit 11 is, for example, a network interface card. For example, the communication processing unit 11 transmits the encrypted data and the auxiliary information to the encryption server 40. Further, the communication processing unit 11 establishes a web session and the like with the encryption server 40 and performs transmission and reception of various data.

The key information DB 12 is a database that stores a public key and a secret key of a user who uses the user terminal 10. For example, the key information DB 12 stores a public key $pk_1$ and a secret key $sk_1$ that are generated with a key parameter (n, q1, t). The key information DB 12 is stored in a storage device such as a hard disk and semiconductor memory.

The key distribution unit 13 is a processing unit that generates encrypted information obtained by encrypting the secret key stored in the key information DB 12 with the public key of the analyst terminal 30 and transmits the generated encrypted information to the encryption server 40. For example, the key distribution unit 13 generates encrypted information $E(sk_1, pk)=(c0', c1')$ of the secret key $sk_1$ encrypted with the public key pk of the analyst and transmits the encrypted information to the encryption server 40. The public key pk of the analyst and the secret key sk are keys capable of performing a predetermined concealment calculation and are generated with a key parameter (n, q, t). Here, q>q1.

The encryption processing unit 14 is a processing unit that encrypts unencrypted data to be analyzed. Specifically, the encryption processing unit 14 performs homomorphic encryption processing on unencrypted data by using the public key stored in the key information DB 12 and generates encrypted data. For example, the encryption processing unit 14 performs the homomorphic encryption processing on plain text information m and generates encrypted data $Enc(m, pk_1)=(c0, c1)$.

The auxiliary information generation unit 15 is a processing unit that generates auxiliary information, which is used when data is re-encrypted, when the data is encrypted. Specifically, the auxiliary information generation unit 15 calculates the auxiliary information by using a combination of the secret key and the public key of the terminal stored in the key information DB 12 and unencrypted data of the encrypted data. For example, the auxiliary information generation unit 15 calculates $\xi=\text{Lift}(c0)+\text{Lift}(c1)*\text{Lift}(sk_1)-m \mod t$. Here, Lift(a) is a natural lifted-up mapping of a ring $R_{q1}=F_{q1}[x]/(x^n+1)$ that defines a foundation space of an encrypted text to a ring $R=Z[x]/(x^n+1)$ of the original a.

The transmission unit 16 is a processing unit that transmits the encrypted data to which the auxiliary information is added to the encryption server 40. Specifically, when the encryption and the generation of the auxiliary information are completed, the transmission unit 16 acquires the encrypted data $Enc(m, pk_1)$ from the encryption processing unit 14 and acquires the auxiliary information $\xi$ from the auxiliary information generation unit 15. Then, the transmission unit 16 transmits the encrypted data with the auxiliary information $(Enc(m, pk_1), \xi)$ to the encryption server 40.

Functional Configuration of Encryption Server

As illustrated in FIG. 2, the encryption server 40 includes a communication processing unit 41, a key information DB 42, an encrypted text DB 43, a re-encrypted text DB 44, a key acquisition unit 45, an encrypted data acquisition unit 46, a re-encryption processing unit 47, and an analysis execution unit 48.

The key information DB 42, the encrypted text DB 43, and the re-encrypted text DB 44 are stored in a storage device such as a hard disk and semiconductor memory. The key acquisition unit 45, the encrypted data acquisition unit 46, the re-encryption processing unit 47, and the analysis execution unit 48 are an example of a process performed by a processor or an example of a circuit included in an electronic circuit.

The communication processing unit 41 is a processing unit that controls communication with the user terminal 10 and the analyst terminal 30. The communication processing unit 41 is, for example, a network interface card. For example, the communication processing unit 41 receives the encrypted data, the encrypted information, and various requests. Further, the communication processing unit 41 establishes a web session and the like with each terminal and perform a transmission and reception of various data.

The key information DB 42 is a database that stores key information of each user terminal and the analyst terminal 30. For example, the key information DB 42 stores the public key pk of the analyst, the encrypted information $E(sk_1, pk)$ acquired from the user terminal 10, and encrypted information $E(sk_2, pk)$ acquired from the user terminal 20. The key information of the user terminal 20 is a public key $pk_2$ and a secret key $sk_2$ that are generated with a key parameter (n, q2, t). Here, q>q2.

The encrypted text DB 43 is a database that stores encrypted data with auxiliary information acquired from each user terminal. For example, the encrypted text DB 43 stores the encrypted data with the auxiliary data (Enc(m, $pk_1$), ξ) acquired from the user terminal 10.

The re-encrypted text DB 44 is a database that stores re-encrypted data that is re-encrypted with the public key of the analyst terminal. For example, the re-encrypted text DB 44 stores Enc(m, pk)=(d0, d1) as a re-encrypted text, which is re-encrypted with the public key pk of the analyst, of an encrypted text Enc(m, $pk_1$) of the plain text information m that is encrypted with $pk_1$.

The key acquisition unit 45 is a processing unit that acquires information related to keys from each terminal and stores the information in the key information DB 42. For example, the key acquisition unit 45 acquires the public key from the analyst terminal 30. Further, the key acquisition unit 45 acquires the encrypted information $E(sk_1, pk)$ of the secret key $sk_1$ encrypted with the public key pk of the analyst from the user terminal 10. The key acquisition unit 45 acquires the encrypted information $E(sk_2, pk)$ of the secret key $sk_2$ encrypted with the public key pk of the analyst from the use terminal 20.

The encrypted data acquisition unit 46 is a processing unit that acquires the encrypted data with auxiliary information from each user terminal and stores the encrypted data with auxiliary information in the encrypted text DB 43. For example, the encrypted data acquisition unit 46 acquires the encrypted data with the auxiliary data (Enc(m, $pk_1$), ξ) from the user terminal 10 and stores the encrypted data with the auxiliary information in the encrypted text DB 43.

The re-encryption processing unit 47 is a processing unit that performs the re-encryption processing when receiving an analysis request from the analyst terminal 30. Specifically, the re-encryption processing unit 47 re-encrypts each encrypted data stored in the encrypted text DB 43 by using the key information of the analyst and stores the re-encrypted data in the re-encrypted text DB 44. Thereafter, the re-encryption processing unit 47 notifies the analysis execution unit 48 that the re-encryption is completed.

For example, the re-encryption processing unit 47 calculates "d0=C0+ξ+c1*C0'" and "d1=c1*c1'" as the re-encryption processing using the auxiliary information for the encrypted data with the auxiliary data Enc(m, $pk_1$), ξ) described above. However, the calculation described above is calculated on a ring $R_q=F_q[x]/(x^n+1)$ of an encrypted text space corresponding to a newly generated key (key of the analyst). Although, here, c0 and c1 are the origin of the ring $R_{q1}$, c0 and c1 are calculated as the origin of a partial space of the ring $R_q$.

Therefore, the re-encryption processing unit 47 defines Enc(m, pk)=(d0, d1) as re-encrypted data, which is re-encrypted with pk, of the encrypted text Enc(m, $pk_1$) of the plain text information m that is encrypted with $pk_1$. When this re-encrypted text is decrypted with the secret key sk of the analyst, the original plain text information m can be restored.

The analysis execution unit 48 is a processing unit that executes analysis processing. For example, when the analysis execution unit 48 is notified that the re-encryption is completed by the re-encryption processing unit 47, the analysis execution unit 48 executes the analysis processing such as addition and multiplication on the re-encrypted data as it is, which is stored in the re-encrypted text DB 44, generates analysis re-encrypted data, and transmits the analysis re-encrypted data to the analyst terminal 30. The analysis processing is not necessarily executed. For example, the analysis execution unit 48 can read the re-encrypted data stored in the re-encrypted text DB 44 and transmit the re-encrypted data as it is to the analyst terminal 30.

Functional Configuration of Analyst Terminal

As illustrated in FIG. 2, the analyst terminal 30 includes a communication processing unit 31, a key information DB 32, a key distribution unit 33, an analysis request unit 34, and a decryption processing unit 35. The key distribution unit 33, the analysis request unit 34, and the decryption processing unit 35 are an example of a process performed by a processor or an example of a circuit included in an electronic circuit.

The communication processing unit 31 is a processing unit that controls communication with the encryption server 40 on the cloud system 5. The communication processing unit 11 is, for example, network interface card. For example, the communication processing unit 31 transmits key information to the encryption server 40. Further, the communication processing unit 31 receives the analysis re-encrypted data after the analysis from the encryption server 40. Further, the communication processing unit 31 establishes a web session and the like with the encryption server 40 and performs transmission and reception of various data.

The key information DB 32 is a database that stores a public key and a secret key of a user who uses the analyst terminal 30. For example, the key information DB 32 stores a public key pk and a secret key sk which are generated with a key parameter (n, q, t) and are capable of performing a predetermined concealment calculation. The key information DB 32 is stored in a storage device such as a hard disk and semiconductor memory.

The key distribution unit 33 is a processing unit that transmits the public key stored in the key information DB 32 to the encryption server 40. For example, the key distribution unit 33 transmits the public key pk of the analyst to the encryption server 40. The analysis request unit 34 is a processing unit that requests the encryption server 40 to perform analysis processing such as addition and multiplication.

The decryption processing unit 35 is a processing unit that decrypts the analysis re-encrypted data received from the encryption server 40. For example, the decryption processing unit 35 receives the re-encrypted data Enc(m, pk)=(d0, d1) after the analysis from the encryption server 40. Then, the decryption processing unit 35 decrypts the re-encrypted data Enc(m, pk)=(d0, d1) by using the own secret key sk stored in the key information NB 32 and restores the plain text information m.

Here, an example is described in which the original plain text information of the encrypted data transmitted by the user terminal 10 is obtained. However, it is not limited to this. For example, when analysis re-encrypted data Enc(T, pk) is obtained as a result of adding each re-encrypted data, it is possible to obtain plain text information T by decrypting the Enc(T, pk) in the same method.

Numerical Example

As the re-encryption process described above, the decryption process of the secret key $sk_1$ of the encrypted text $Enc(m, pk_1)$ of the plain text information m encrypted with the public key $pk_1$ of the user terminal 10 is calculated as $[c0+c1*sk_1]_{q1}$ mod t. However, from the configuration method of the auxiliary information ξ, the decryption process can also be calculated by $Lift(c0)+Lift(c1)*Lift(sk_1)-m$ mod t.

Therefore, when the decryption process described above is operated with an encrypted text on the public key pk of the analyst by using information of $Enc(sk_1, pk)=(c0', c1')$ which is obtained by encrypting the secret key $sk_1$ of the user terminal 10 with the public key pk of the analyst, the above re-encryption process itself is performed. In other words, in the re-encryption process disclosed in the embodiment, the decryption process is simplified by the auxiliary information and a process in which the simplified decryption process is evaluated by a homomorphic encryption operation is performed. Here, a numerical example of the re-encryption process using the auxiliary information will be illustrated.

When an initial key parameter, that is, the key parameter of the user terminal 10 in the above example, is (n, q1, t)=(4, 1033, 20), an initial key pair, that is, a key pair $(pk_1, sk_1)$ of the user terminal 10 in the above example, is generated as follows:

$pk_1=(a0,a1), a0=Mod(Mod(885,q)*x^3+Mod(519,q)$
$*x^2+Mod(621,q)*x+Mod(327,q),x^4+1), a1=Mod$
$(Mod(661,q)*x^3+Mod(625,q)*x^2+Mod(861,q)$
$*x+Mod(311,q),x^4+1)$ $sk_1=Mod(Mod(4,q)*x^3+Mod(4,q)*x^2+Mod(1,q)*x,x^4+1)$

Next, an encrypted text with auxiliary information (Enc$(m, pk_1)$, ξ) corresponding to a plain text $m=3+2x+2x^2+2x^3$ is calculated as follows:

$Enc(m,pk_1)=(c0,c1), c0=Mod(Mod(822,q)*x^3+Mod(1016,q)*x^2+Mod(292,q)*x+Mod(243,q),x^4+1),$
$c1=Mod(Mod(840,q)*x^3+Mod(275,q)*x^2+Mod(628,q)*x+Mod(911,q),x^4+1)$ $ξ=12+19x+14x^2+9x^3$

A new key pair generated from a new key parameter, that is, a key parameter (n, q, t)=(4, 1073741827, 20) of the analyst, that is, a key pair (pk, sk) of the analyst in the above example, is obtained as follows:

$pk=(b0,b1), b0=Mod(Mod(175962546,q)*x^3+Mod(371803344,q)*x^2+Mod(218138672,q)*x+Mod(224156286,q),x^4+1), b1=Mod(Mod(476812016,q)*x^3+Mod(135271255,q)*x^2+Mod(610902088,q)*x+Mod(561030593,q),x^4+1)$ $sk=Mod(Mod(4,q)*x+Mod(3,q),x^4+1)$

Then, a re-encrypted text Enc(m, pk)=(d0+d1) that is re-encrypted with the public key pk of the plain text m is calculated as follows:

A pk encrypted text $(c0', c1')$ of the secret key $sk_1$,
$c0'=Mod(Mod(855259453,q)*x^3+Mod(249061504,q)*x^2+Mod(785050327,q)*x+Mod(271540493,q),x^4+1), c1'=Mod(Mod(914225662,q)*x^3+Mod(442693250,q)*x^2+Mod(142565746,q)*x+Mod(770540096,q),x^4+1)$ $d0=Mod(Mod(890335203,q)*x^3+Mod(1000403695,q)*x^2+Mod(1066115607,q)*x+Mod(243516610,q),x^4+1)$ $d1=Mod(Mod(965623301,q)*x^3+Mod(137137351,q)*x^2+Mod(184084287,q)*x+Mod(132274992,q),x^4+1)$ From the above, the re-encrypted text Enc(m, pk) of the plain text information m, which is re-encrypted with pk, calculated above can be restored to the original plain text information m with the secret key sk corresponding to pk.

Process Flow

Figure 3:
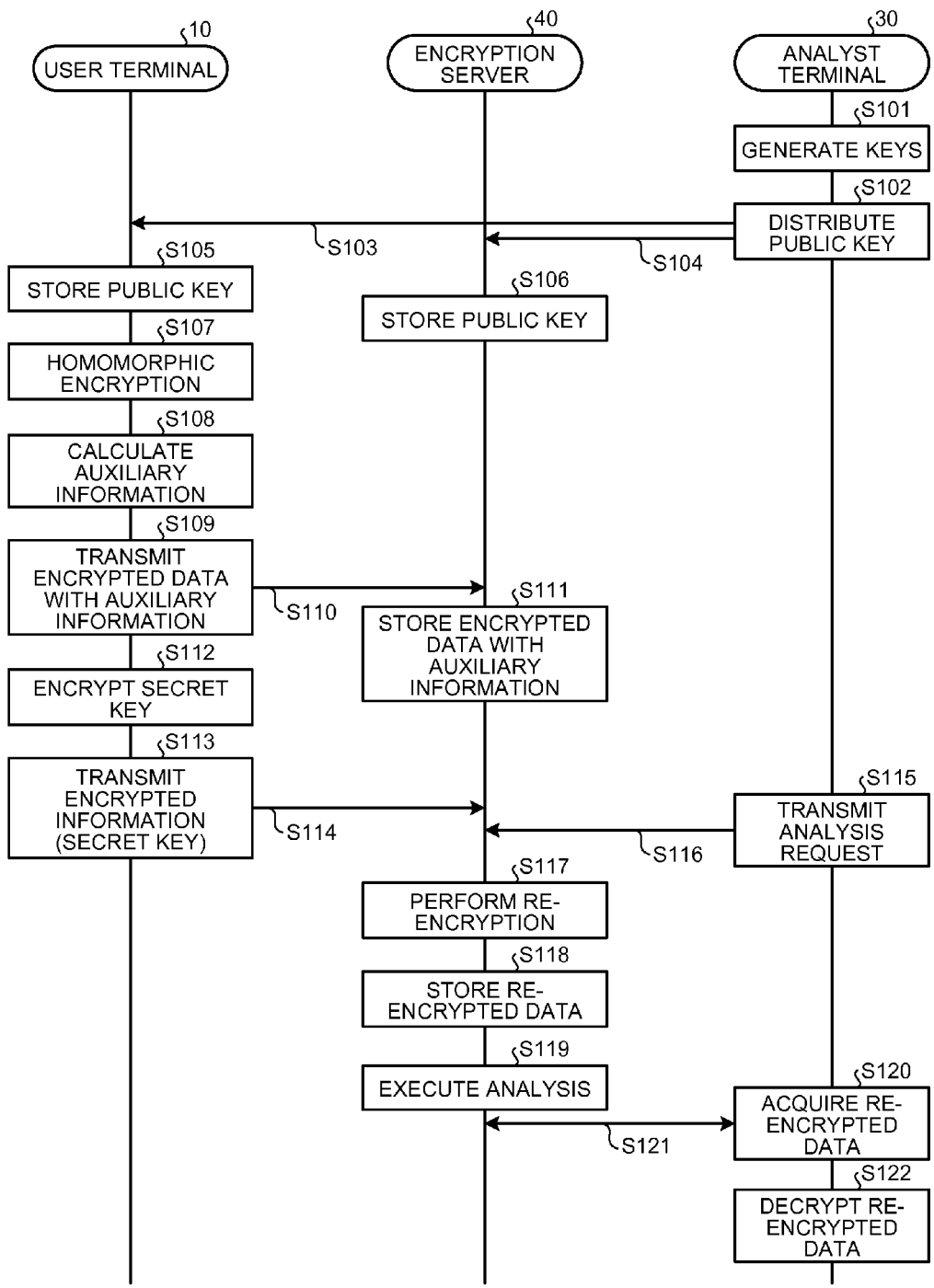
FIG. 3 is a sequence diagram of a process performed by the system according to the first embodiment.

FIG. 3 is a sequence diagram of a process performed by the system according to the first embodiment. As illustrated in FIG. 3, the analyst terminal 30 generates a common key and a public key which are capable of performing a predetermined concealment calculation (step S101) and distributes the public key to the user terminal 10 and the encryption server 40 (from step S102 to step S104). Subsequently, the user terminal 10 stores the received public key of the analyst in a storage device such as the key information DB 12 (step S105), and in the same manner, the encryption server 40 stores the received public key of the analyst in the key information DB 42 or the like (step S106).

Then, the user terminal 10 performs normal homomorphic encryption to generate encrypted data (step S107). Specifically, the user terminal 10 encrypts an analysis target user by using the public key of the user terminal 10.

Subsequently, the user terminal 10 calculates the auxiliary information by using a combination of the secret key and the public key of the user terminal 10 and unencrypted data of the encrypted data (step S108). Then, the user terminal 10 transmits the encrypted data to which the auxiliary information is added to the encryption server 40 (step S109 and step S110). The encryption server 40 stores the encrypted data with the auxiliary information in the encrypted text DB 43 (step S111).

Then, the user terminal 10 encrypts the secret key of the user terminal 10 with the public key of the analyst (step S112) and transmits encrypted information which is information of the encrypted secret key to the encryption server 40 (step S113 and step S114).

Thereafter, the analyst terminal 30 transmits an analysis request to the encryption server 40 (step S115 and step S116). The encryption server 40 that receives the analysis request performs re-encryption of the encrypted data by using the auxiliary information added to the encrypted data, the public key of the analyst, and the encrypted information of the secret key of the user terminal 10 received in step S114 (step S117). Subsequently, the encryption server 40 stores the generated re-encrypted data in the re-encrypted text DB 44 (step S118). Then, the encryption server 40 executes the requested analysis processing (step S119).

Thereafter, the analyst terminal 30 acquires the re-encrypted data after the analysis from the encryption server 40 (step S120 and step S121) and decrypts the re-encrypted data with the secret key of the analyst terminal 30 to obtain an analysis result (step S122).

Description of Re-Encryption

Figure 4:
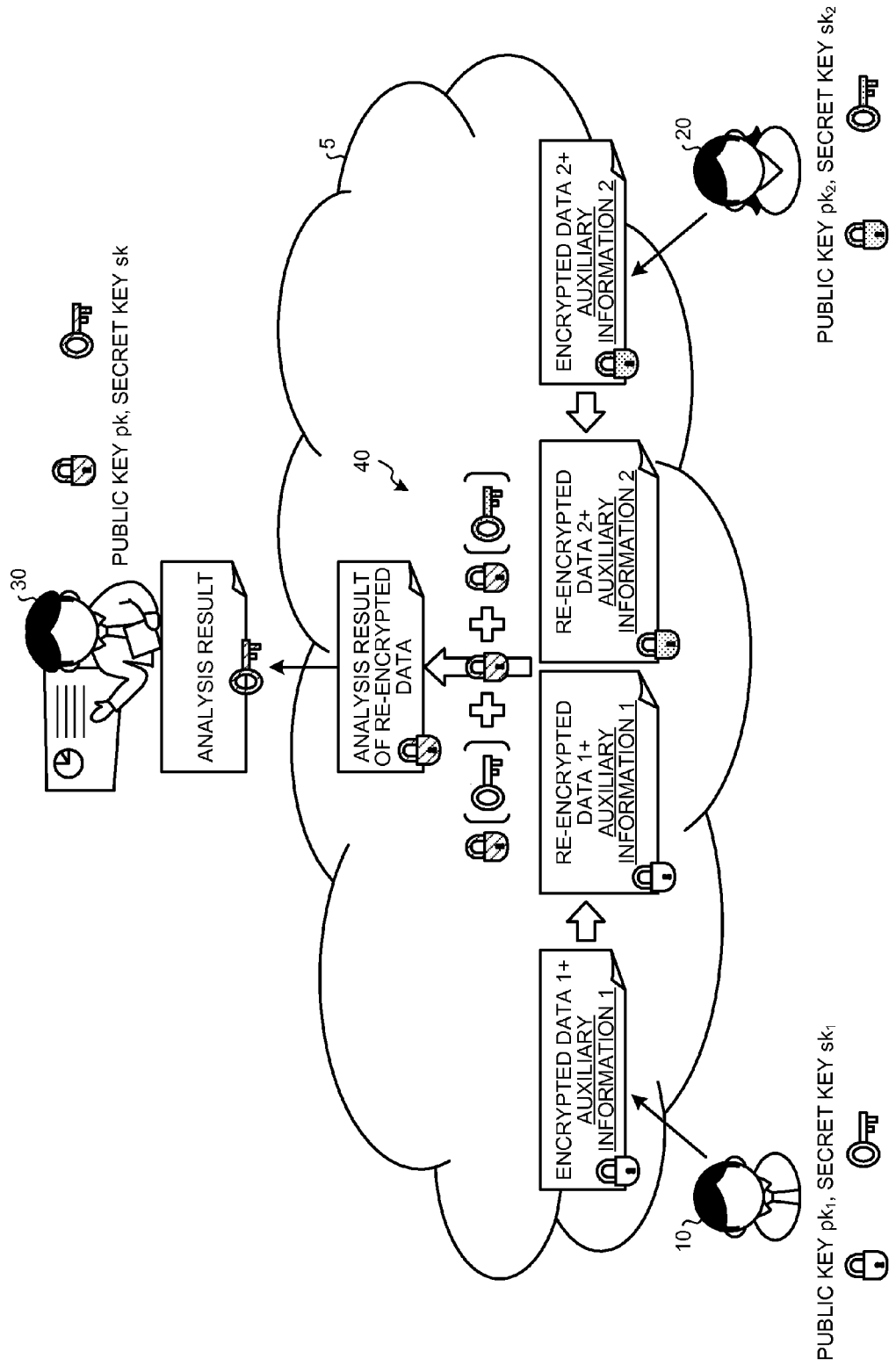
FIG. 4 is a diagram for explaining re-encryption according to the first embodiment.

Next, a general flow of the re-encryption according to the first embodiment will be described. FIG. 4 is a diagram for explaining the re-encryption according to the first embodiment.

As illustrated in FIG. 4, the user terminal 10 holds the public key $pk_1$ and the secret key $sk_1$ of the user terminal 10, the user terminal 20 holds the public key $pk_2$ and the secret key $sk_2$ of the user terminal 20, and the analyst terminal 30 holds the public key pk and the secret key sk of the analyst terminal 30.

The encryption server 40 on the cloud system 5 holds the public key pk of the analyst, the encrypted information related to the secret key $sk_1$ of the user terminal 10 encrypted with the public key pk of the analyst, and the encrypted information related to the secret key $sk_2$ of the user terminal 20 encrypted with the public key pk of the analyst.

The user terminal 10 adds the auxiliary information 1 generated from information of the key pair of the user terminal 1, a plain text, and the like to the encrypted data 1 obtained by encrypting the plain text with the public key $pk_1$ of the user terminal 10 and transmits the encrypted data 1 to the encryption server 40. In the same manner, the user terminal 20 adds the auxiliary information 2 generated from information of the key pair of the user terminal 20, a plain text, and the like to the encrypted data 2 obtained by encrypting the plain text with the public key $pk_2$ of the user terminal 20 and transmits the encrypted data 2 to the encryption server 40.

The encryption server 40 re-encrypts the encrypted data 1 by using the auxiliary information 1 added to the encrypted data 1, the public key pk of the analyst, and the encrypted information related to the secret key $sk_1$ of the user terminal 10 encrypted with the public key pk of the analyst to generate the re-encrypted data 1. In the same manner, the encryption server 40 re-encrypts the encrypted data 2 by using the auxiliary information 2 added to the encrypted data 2, the public key pk of the analyst, and the encrypted information related to the secret key $sk_2$ of the user terminal 20 encrypted with the public key pk of the analyst to generate the re-encrypted data 2.

Then, the encryption server 40 executes analysis processing by using the re-encrypted data 1 as it is and the re-encrypted data 2 as it is and generates post-analysis re-encrypted data. Thereafter, the analyst terminal 30 acquires the post-analysis re-encrypted data and decrypts the post-analysis re-encrypted data with the secret key of the analyst terminal 30 to obtain an analysis result.

Effects

In this way, in the system according to the first embodiment, when data is encrypted, auxiliary information used to perform re-encryption is added to the data and processing using the auxiliary information is performed when the re-encryption is performed, so that the processing cost is reduced.

Therefore, in the system according to the first embodiment, it is possible to significantly reduce the cost of re-encryption processing of the homomorphic encryption. Specifically, while the number of times of performing encryption multiplication used to perform normal re-encryption is 10,000 or more, the number of times of performing encryption multiplication is two in the re-encryption processing using the auxiliary information described in the first embodiment, so that it is possible to perform re-encryption several thousand times faster than conventional processing.

[b] Second Embodiment

While the embodiment of the present invention has been described, the present invention may be implemented in various different forms in addition to the embodiment described above.

System

Among the processes described in the embodiment, all or some of the processes that are automatically performed may be performed manually. Alternatively, all or some of the processes that are manually performed may be performed automatically by a known method. Moreover, the processing procedures, control procedures, specific names, and information including various data and parameters described in the above embodiments and the drawings can be arbitrarily changed unless otherwise stated.

The components of the devices illustrated in the drawings are functionally conceptual, and need not necessarily be physically configured as illustrated in the drawings. In other words, specific forms of distribution and integration of the devices are not limited to those illustrated in the drawings. That is to say, all or some of the devices can be functionally or physically distributed or integrated in arbitrary units according to various loads and the state of use. Moreover, all or any part of the processing functions performed in each device can be realized by a CPU and a program analyzed and executed by the CPU, or can be realized as hardware by wired logic.

Hardware

Figure 5:
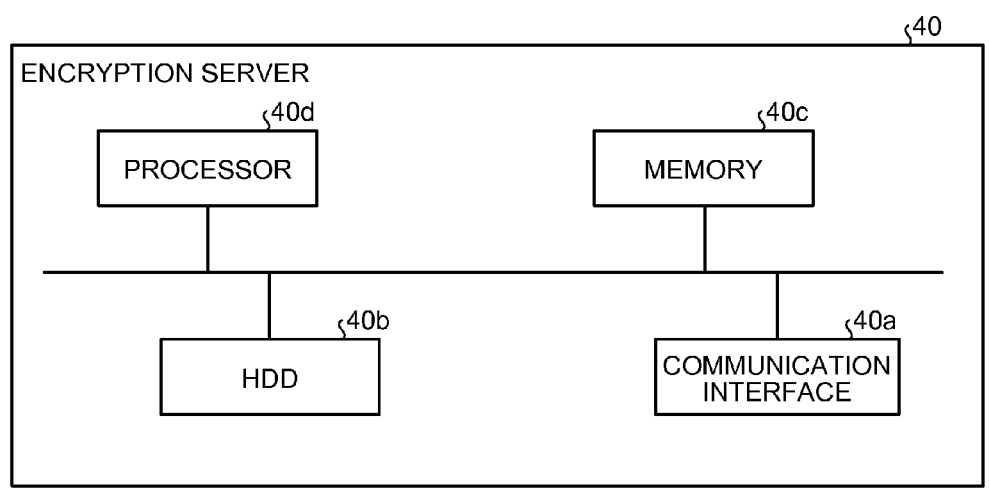
FIG. 5 is a diagram illustrating a hardware configuration example.

FIG. 5 is a diagram illustrating a hardware configuration example. Each device illustrated in FIG. 1 has the same configuration, so that here the encryption server 40 will be described as an example.

As illustrated in FIG. 5, the encryption server 40 includes a communication interface 40a, an HDD (hard disk drive) 40b, a memory 40c, and a processor 40d. Each unit illustrated in FIG. 5 is connected to each other through a bus or the like.

The communication interface 40a is an interface that controls communication with other devices. The communication interface 40a is, for example, an interface card. The HDD 40b stores a program for causing the functions illustrated in FIG. 2 and the like to be operated and DBs.

The processor 40d causes a process that performs the functions described in FIG. 2 and the like to be operated by reading a program that performs the same processing as that of the processing units illustrated in FIG. 2 and the like from the HDD 40b and the like and loading the program in the memory 40c.

In other words, the process performs the same functions as those of the processing units included in the encryption server 40. Specifically, the processor 40d reads a program having the same functions of those of the key acquisition unit 45, the encrypted data acquisition unit 46, the re-encryption processing unit 47, and the analysis execution unit 48 from the HDD 40b or the like. Then, the processor 40d performs a process that performs the same processing operations as those of the key acquisition unit 45, the encrypted data acquisition unit 46, the re-encryption processing unit 47, and the analysis execution unit 48.

The encryption server 40 reads and executes the program in this way, so that the encryption server 40 operates as an information processing device that performs an encryption method. Further, the encryption server 40 can also realize the same function as that of the embodiment described above by reading the program from a recording medium by using a medium reading device and executing the read program. The program used in this other embodiment is not limited to be executed by the encryption server 40. For example, the present invention can also be applied when another computer or another server executes the program and when these devices execute the program in cooperation with each other.

According to an embodiment, it is possible to reduce the processing time of the re-encryption process.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encryption device comprising:
a reception unit that receives encrypted data which is encrypted by using a public key of a first user and which is added with auxiliary information calculated using data that has not yet been encrypted and a combination of a secret key and the public key of the first user; and
a generation unit that generates re-encrypted data obtained by re-encrypting the encrypted data using the auxiliary information added to the encrypted data, a public key of a second user, and encrypted information related to the secret key of the first user which is encrypted with the public key of the second user,
wherein the public key and a common key of the first user and the public key and a common key of the second user are generated by a key parameter including a first parameter that represents a lattice dimension, a second parameter that is an arbitrary prime number, and a third parameter that is an arbitrary prime number smaller than the second parameter, and the second parameter corresponding to the second user is a prime number greater than the second parameter corresponding to the first user.

2. An encryption method comprising:
receiving encrypted data which is encrypted using a public key of a first user and which is added with auxiliary information calculated using data that has not yet been encrypted and a combination of a secret key and the public key of the first user; and
generating re-encrypted data obtained by re-encrypting the encrypted data by using the auxiliary information, a public key of a second user, and encrypted information of the secret key of the first user which is encrypted with the public key of the second user,
wherein the public key and a common key of the first user and the public key and a common key of the second user are generated by a key parameter including a first parameter that represents a lattice dimension, a second parameter that is an arbitrary prime number, and a third parameter that is an arbitrary prime number smaller than the second parameter, and the second parameter corresponding to the second user is a prime number greater than the second parameter corresponding to the first user.

3. An information processing device comprising:
an encryption unit that encrypts data using a public key of a first user;
a calculation unit that calculates auxiliary information using a combination of a secret key and the public key of the first user and the data that has not yet been encrypted; and
a transmission unit that adds the auxiliary information calculated by the calculation unit to encrypted data generated by the encryption unit and transmits the encrypted data to an encryption device,
wherein the public key and a common key of the first user and the public key and a common key of the second user are generated by a key parameter including a first parameter that represents a lattice dimension, a second parameter that is an arbitrary prime number, and a third parameter that is an arbitrary prime number smaller than the second parameter, and the second parameter corresponding to the second user is a prime number greater than the second parameter corresponding to the first user.

* * * * *